Patented Feb. 17, 1953

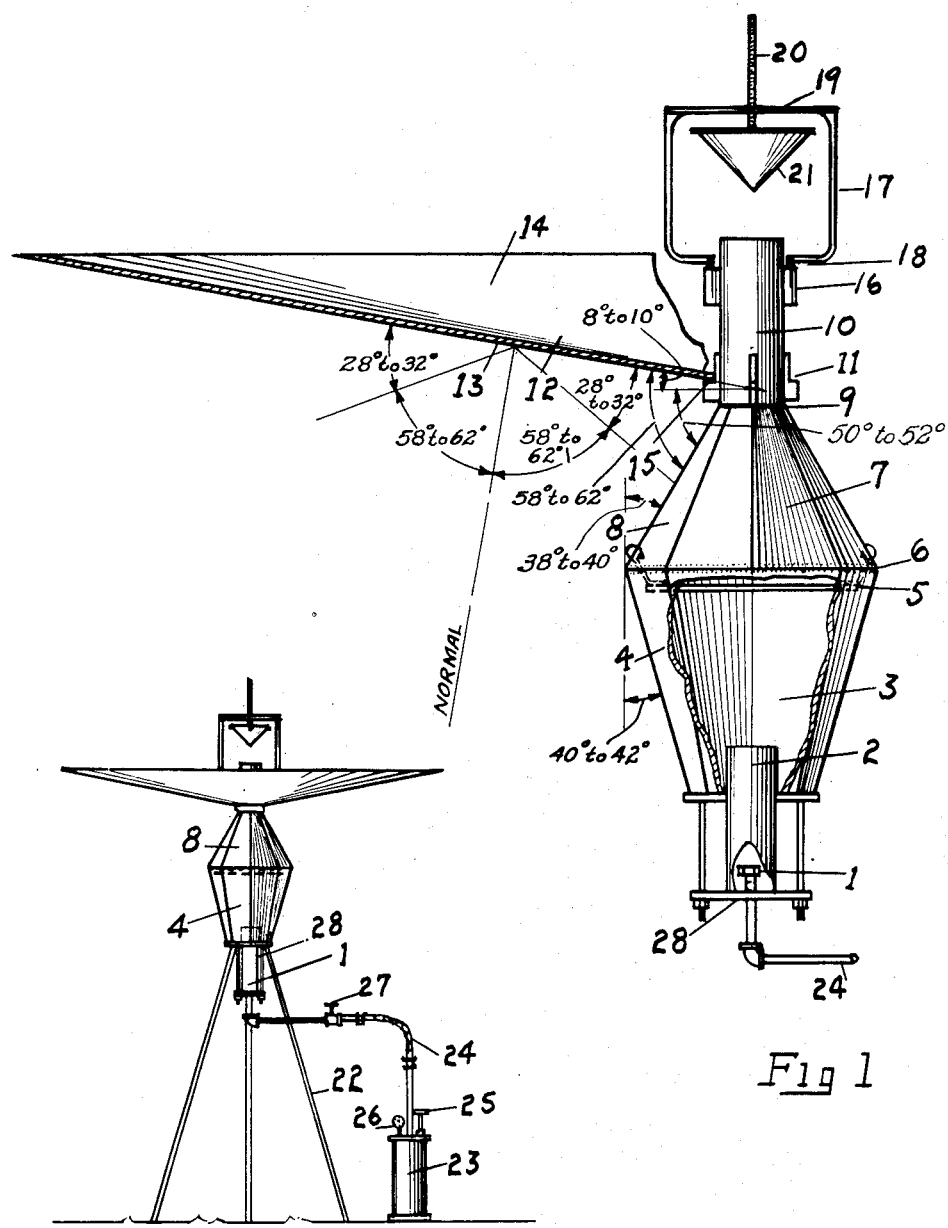

2,628,609

UNITED STATES PATENT OFFICE 2,628,609

RADIANT HEATER FOR PLANT PROTECTION

Hollis P. Bacon, Sarasota, Fla.

Application November 17, 1948, Serial No. 60,599

3 Claims. (Cl. 126—59.5)

This invention relates to radiant heaters for use in protecting gardens, nurseries, fields, groves and other areas of living vegetation from abnormal temperature conditions such as frost or temperatures below a critical minimum, as well as for smoothing out the time-temperature curve of the living vegetation through building up the time valleys of night or sunless periods.

By the term "living vegetation" I intend to refer to all living flora, including grasses, plants, shrubbery and trees.

The heater is adapted for use in outdoor areas in which are grown either seasonal or hardy plants of all sorts, normally withstanding the climatic conditions to which they are subjected, but which may be subjected occasionally to harmful or ruinous frost or critical low temperatures. It is equally adapted to growth areas under some measure of structural protection or shelter, to which it is desired to supply heat directly or to the immediate soil wherein they are rooted. While such a heater is useful in connection with all growth above the ground surface, it is also effective in blanketing the ground surface to shield living vegetation, or the roots and parts thereof, below the ground surface from lowered exterior temperatures.

For these and kindred purposes there have been employed bonfires or smudges; electric installations for generating heat and infra-red rays; and various types of oil or other fuel burning equipment. These expedients have been unsatisfactory, largely because they have not been designed or applied to scientifically and practically accomplish the desired purpose. Principally, I believe, the mistake has been made of trying to heat the entire atmosphere of a growth area which is needlessly expensive and largely superfluous, and in many cases futile, especially when prolonged periods of low temperatures are encountered.

A principal object of my invention is to provide an efficient heater for living vegetation based on sound and established principles of radiant heating. I provide such a heater by precalculating its relative angles for the most effective directly-radiant and reflectively-radiant imparting of heat rays, taking into account the nature and conditions of the vegetation, the climate and surroundings.

Another object is to provide such a heater that may be adjusted in advance of use as to its angles and spread of direct and reflective radiance to accommodate the heater to the type and size of growth to be protected.

A further object is to provide a readily portable fluid fuel burning heater which is efficient and economical to operate; while designed to distribute its output to the best advantage taking into account the nature, size and height of the living vegetation to be protected.

With these and other objects in view, my invention consists in the novel construction of a radiant heater, for the accomplishment of the stated purposes of the invention, as fully disclosed in the specification and drawing hereof, and in the appended claims.

In the drawing:

Fig. 1 is a side elevation with portions broken away of a radiant heater embodying my invention.

Fig. 2 is an elevation, to reduced scale, of the complete heater including fuel supply means.

In a preferred form the radiant heater is approximately 7 ft. 9 in. over-all height above the ground and uses fuel oil as a heat source. An oil nozzle 1 is centrally located in the lower end of a cylindrical preheating chamber 2, the upper end of which is fixed in an octahedral combustion chamber 3, formed of flat sides or surfaces 4, narrow at the base and widening toward the top. While the number of plate sides is not limited to eight, it is, in my invention, essential that flat surfaces be employed and preferably be uniform and equal, or substantially so, in dimension. The upward and outward flare of the combustion chamber 3 is approximately 40 to 42° from vertical. This inclination, however, is not critical and is determined in accordance with the radius of coverage desired for the device. There is also the factor of the height of support above the ground which obviously contributes to the distance of space coverage.

The side plates 4 are welded to similar plates 8 of a radiation chamber 7 above the combustion chamber 3 as shown by the line of the welding bead 6 just below which is located a disc baffle 5 suitably supported in a horizontal position near the top of the combustion chamber. The sides 8 are widest at their lower ends inclining inwardly and upwardly to an upper welding bead 9 where the plates 8 are welded to a chimney 10 which may be cylindrical in form.

The angle of incline of the side plates 8 of the radiation chamber 7 is about 38 to 40° from vertical and is related to the inclination of the sides of the combustion chamber 3 and related to the desired spread or throw over the surrounding ground and growth. A short cylindrical chimney 10 is provided exteriorly with L-shaped metal clips 11 which may be welded or otherwise attached at four points to the exterior of the chimney to serve as shoulders to receive and support thereon a widely extended concavo-convex reflector 12 which is preferably made of polished sheet aluminum or the equivalent formed with an upper concave surface and an under convexed surface radially projected to subtend a low angle from the horizontal approximately 8 to 10°. The diameter of the reflector is preferably about 4' in a construction wherein the over-all height of the heater is approximately 8'. The heater body being about 28 to 30" in height, 16" at diameter 6 and with the radiation chamber 7 having a height of about 12" narrowed to about 4" at the top with an exterior radiation angle of 38 to 40°. The reflector has a central opening with an annular edge 15 by which it fits over the chimney 10 and rests upon the shoulder clips 11.

In Fig. 1 I have indicated a preferred embodiment of the various angles of inclination of the parts. The angle of the convexed under surface of the reflector 12 is approximately 8 to 10° from the horizontal, while the angle formed by the junction of the radiation plates 8 with the under surface of the reflector 12 is approximately 58 to 62°. Thus radiation from the plates 8 to the reflector 12 strike in straight lines within approximately the entire under area of the reflector 12 so that the angles of incidence and reflection are approximately 58 to 62°

It will be appreciated that the various dimensions and angles mentioned are for illustration only and are not to be considered as limiting. Since the heaters may be made in different sizes for different regions and climate, dimensions are largely a matter of relative proportion. The reflector 12 extends widely beyond the radiation chamber and combustion chamber on all sides and has a radius of more than double the radius at the junction line 6 between the chambers.

Above the chimney 10 is mounted a yoke 17 on the lower ends of which are pins 18 fitting into tubular sockets 16 welded to the chimney 10. The top cross-bar 19 of the yoke 17 is centrally threaded to receive a threaded stem 20 carrying on its lower end an inverted conical deflector or damper 21 which serves as a reflector of any flames or heat discharging from the chimney 10. This tends to diminish the radiation of heat from the rising column of gas and flames and reflect heat from the surface 21 downwardly upon the upper surface 14 of the reflector 12. At the same time the adjustable damper 21 may be used to impede the exit of gases and prevent aspirating or chimney action upwardly from the assembly which otherwise would tend to suck upwardly heated air surrounding the assembly and lose it to the upper atmosphere. Thus the adjustable damper 21 serves three primary purposes. It may be used to impart a varying back pressure upon the combustion gases immerging from the chamber 7. It may also act as a reflector slightly heating the upper surface of the reflector 12. Thirdly, it may break the otherwise possible chimney action of the upwardly rising stream of heated gases which would aspirate or suck to upper atmosphere and thus lose much of the heated ambient air around the heater.

The entire assembly is supported on a tripod 22 in such a manner as to be movable from place to place. A tank 23 is employed to contain oil and air under pressure for forcing the oil through a flexible pipe 24. The hand pump 25 is used to put air pressure upon the oil for forcing the same through the burner 1. I also provide a gage 26 and shut-off valve 27. From this description, taken in connection with the drawing, it will be understood how my improved radiant heater operates. Oil within the tank 23 is placed under pressure by means of the hand pump 25 and is admitted to the burner 1 by manipulation of the control valve 27. When ignited at the nozzle 1 the flames within the combustion chamber 3 are forced into contact with the side plates 4 through the annular space around the periphery of the baffle 5 and enter the radiation chamber 7 hugging the inner wall thereof. Thus the heated gases and flame are forced to contact the inner wall of the chambers 4 and 7 and heat the inner surfaces of the flat plates 4 and 8. The surfaces 4 and 8 are usually raised to cherry red heat and it will be quite evident that the heat rays from the outer surface of the plates 8 will strike in straight lines against the under surface 13 of the reflector 12 and be reflected away therefrom in accordance with the angles of incidence and reflection.

From this it will be seen that heat radiates directly away in straight lines from the outer surfaces of the combustion chamber side plates 4 and is at the same time reflected from the under surface of the reflector 12 in straight line to cover a wider area beyond the extent of the straight line radiation from the side plates 4. The rays from the combustion chamber will be direct radiation from its sides to the ground and the plants thereon to a limited radius surrounding the center axis. There is some direct vertically downward heat from the burner nozzle to the ground and ample elevation is necessary to prevent scorching and also to raise the radiation point of plates 4 in definite relation to their angle of inclination.

By the polyhedral form of the heater sides the flat face plates 4 will provide a more scientific and efficient radiation than from any cylindrical surface. The flat plates present their whole faces to the ground in direct line whereas the curved surface deflects a large portion of the heat rays to the side and radiates only a diffused or scattered heat at the point of intended heating. Thus there is a more intense heat applied directly at the target of each plate without diffusion and dissipation through the surrounding atmosphere as I believe will be understood by those conversant with the laws of heat radiation in a direct line. By knowing the radiation capacity of the heater first from the burner vertical and from the angle of the plates 4 and the height of the device above ground level, the said plates may be constructed to slant or incline at the correct pitch for radius and area coverage as desired.

Coming now to the radiation from the upper chamber 7 this, in conjunction with the under surface 13 of the reflector 12, provides a greater volume and importance of reflected radiation than that which is directly radiated from the plates 4 below. The relative inclination of the plates 8 to the vertical and the slope of the under surface 13 to the horizontal is such that the effective reflection from the reflector normally strikes beyond the outermost range of radiation from the plates 4 and carries on to a maximum radius supplementing or complementing the direct radiation. Practically all of the radiations from the sides 8 will strike the underside of the reflector within the 4 ft. wide area of the reflector surface and none will be lost by departing beyond the edge of said reflector, hence there will be a complete reception by the surface 13 of all the radiation from the sides 8 of the radiation chamber.

In addition to the vertical heating by the burner directly below the assembly, and the close radiation of the plates 4 of the combustion chamber, and the wide radiation of the reflector 12, there will be supplemented an auxiliary deflection of heat from the conical heat ray deflector and damper 21. The smaller amount of heat reflected downwardly by the under surface of the damper 21 from the lower temperature gases leaving the chimney 10 will serve to warm the upper surface of the reflector 12, counterbalancing any loss of heat therefrom by conduction through from that radiation impinging on its lower surface.

In actual field tests of my improved radiant heater I have found it very speedy and of enduring radiation of heat to the soil and plants. With the heater made according to the specifications and of the dimensions given herein, I find adequate well distributed radiation over a coverage of 70 to 80 ft. radius in all directions from the heater. The distance covered will of course depend upon the dimensions, angles, and elevation of the heater above the ground. The amount of heat subjected upon the heated area will depend to a great degree upon the rate of fuel burned.

The construction described is such as to make the unit readily portable and allows changing certain of the mounting and assembly dimensions with ease. The assembly of elements 17, 18, 19, 20 and 21 are readily removable from the socket 16. Thereupon the reflector 13 may be lifted from the lugs 11 upon which it normally rests as at 15 surrounding the chimney 10. The tripod legs 22 may be unscrewed or unbolted from the assembly and replaced with longer or shorter ones as desired. The reflector is applicable and removable by slipping over the chimney. The conical element 21 is depressible to and into the chimney at will. I do not use and do not favor a cylindrical heater body, which diffuses heat instead of directly radiating it in straight lines to its target.

While I have described my invention in preferred dimension and embodiment, it will be understood that this is by way of illustration only and not to be considered as limiting.

I claim:

1. A radiant heater for the protection of living vegetation during periods of lowered temperatures, including in combination, a combustion chamber supported above the ground and which radiates heat rays from its exterior downwardly and outwardly, a fuel burner communicating with the combustion chamber, a fuel supply for the burner, a radiation chamber above the combustion chamber and communicating therewith, a baffle mounted within and near the top of said combustion chamber and out of contact with the shell of same to leave a peripheral space between said baffle and the interior of the combustion chamber to direct all flames and heat gases through said peripheral space against the inner wall of said radiation chamber, the radiation chamber being formed in polyhedral form of flat side surfaces, each surface being inclined upwardly and inwardly at an arranged angle to radiate heat therefrom, a chimney at the top of the radiation chamber, a wide reflector mounted above the radiation chamber, and a vertically adjustable element mounted above said chimney and having upwardly and outwardly flaring sides to reflect heat arising from the chimney outwardly upon the upper surface of the reflector, said element movable down toward the top of the chimney to control the discharge speed of hot gases arising therefrom.

2. A radiant heater for the protection of living vegetation during periods of lowered temperature, including in combination, a suitably supported burner means, a combustion chamber supported above the ground and into which said burner extends, a fuel supply means connected to and in communication with said burner, said combustion chamber being polyhedral in body and formed of a series of flat side surfaces inclined upwardly and outwardly, so that the exterior faces of the surfaces will radiate heat directly to an area of the ground in straight lines, means forming a polyhedral radiation chamber joined in communication to the top of said combustion chamber and formed of similar flat side surfaces inclined upwardly and inwardly from their junction with the combustion chamber to their upper ends, a baffle mounted within the combustion chamber near the junction of said combustion chamber with the radiation chamber, said baffle being out of contact with the shell of said combustion chamber leaving a space between said baffle and said shell to direct all flames and heat gases outwardly to the side surfaces of the radiation chamber, a chimney mounted on top of the radiation chamber and provided with clip shoulders thereon, a concavo-convex reflector centrally orificed to fit over said chimney and rest upon said shoulders and mounted normal to the axis of said radiation chamber being convexed on its under face at a low degree of convexity, the degree of convexity being such relative to the inclination of the radiation chamber surfaces that most of the heat emanating from the radiation chamber surfaces will contact the reflector, and a vertically adjustable conical element mounted above said chimney and said radiation chamber and adapted to reflect heat arising from the chimney outwardly to the upper face of the reflector, said element adapted to be depressed down toward the chimney to control the discharge speed of hot gases arising therefrom.

3. A radiant heater for the protection of living vegetation during periods of lowered temperatures, including in combination, a combustion chamber supported above the ground and which radiates externally upon the ground and living vegetation, a fuel burner communicating with the combustion chamber, a fuel supply for the burner, said combustion chamber being formed with a polyhedral body of flat side surfaces inclined upwardly and outwardly and radiating heat rays outwardly in straight lines to the ground below, a radiation chamber above the combustion chamber and communicating therewith, said radiation chamber having a polyhedral body formed of flat side surfaces inclined upwardly and inwardly, a wide reflector mounted above and normal to the axis of the radiation chamber and convexed on its under surface at a low degree of convexity, the degree of convexity being such relative to the inclination of the radiation chamber surfaces that most of the heat emanating from the radiation chamber surfaces will contact the reflector, and an element centrally mounted above the radiation chamber exit and having outwardly flaring sides to reflect heat arising from the radiation chamber outwardly upon the upper surface of the reflector, said element being vertically adjustable relative to the gas exit of the radiation chamber to variably impede the exit of hot gases therefrom.

HOLLIS P. BACON.

REFERENCES CITED

The following references are of record in the file of this patent:

UNITED STATES PATENTS

| Number | Name | Date |
|---|---|---|
| 844,583 | Dixon | Feb. 19, 1907 |
| 931,557 | Barney | Aug. 17, 1909 |
| 971,347 | Bentley | Sept. 27, 1910 |
| 1,500,962 | Slezinsky | July 8, 1924 |
| 1,503,066 | Shikora et al. | July 29, 1924 |
| 1,505,482 | Morrow | Aug. 19, 1924 |
| 1,749,710 | Maddalena | Mar. 4, 1930 |
| 2,300,105 | Colosimo | Oct. 27, 1942 |
| 2,522,935 | Farrall | Sept. 19, 1950 |

OTHER REFERENCES

American Civil Engineers' Handbook, Merriman, Fourth Edition, John Wiley and Sons, 432 Fourth Avenue, New York. (Copy available in Division 19, U. S. Patent Office.